(12) United States Patent
Kelly

(10) Patent No.: US 11,465,365 B2
(45) Date of Patent: *Oct. 11, 2022

(54) FRICTION PAD WITH ENHANCED ANTI-SLIP PROPERTIES

(71) Applicant: Cat Tongue, Inc., Park City, UT (US)

(72) Inventor: Matt Kelly, Park City, UT (US)

(73) Assignee: Cat Tongue, Inc., Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,186

(22) Filed: Sep. 4, 2020

(65) Prior Publication Data

US 2020/0398497 A1 Dec. 24, 2020

Related U.S. Application Data

(63) Continuation-in-part of application No. 15/917,451, filed on Mar. 9, 2018, now Pat. No. 10,780,646.

(60) Provisional application No. 62/564,514, filed on Sep. 28, 2017, provisional application No. 62/474,024, filed on Mar. 20, 2017.

(51) Int. Cl.
*C09J 7/24* (2018.01)
*C09J 7/30* (2018.01)
*B29L 31/16* (2006.01)
*B29K 23/00* (2006.01)
*B29C 65/48* (2006.01)

(52) U.S. Cl.
CPC .............. *B29C 65/48* (2013.01); *C09J 7/243* (2018.01); *C09J 7/30* (2018.01); *B29K 2023/065* (2013.01); *B29L 2031/16* (2013.01)

(58) Field of Classification Search
CPC .... B29C 65/48; C09J 7/243; C09J 7/30; C09J 2301/16; C09J 2433/00; C09J 7/20; B29L 2031/16; B29K 2023/065
See application file for complete search history.

(56) References Cited

U.S. PATENT DOCUMENTS

| 5,508,084 A | * | 4/1996 | Reeves | B29C 37/0053 428/172 |
| 6,509,084 B2 | * | 1/2003 | Sturtevant | B29C 51/02 428/141 |

(Continued)

*Primary Examiner* — Nathan L Van Sell
(74) *Attorney, Agent, or Firm* — Roeder & Broder LLP; Steven G. Roeder

(57) ABSTRACT

A friction pad (12) for inhibiting movement of a device (10) relative to an engagement surface (16) includes a pad body (18) and an adhesive material (232). The pad body (18) has a first body surface (20) and an opposed second body surface (22). The first body surface (20) is configured to be coupled to an outer surface (14) of the device (10). The second body surface (22) is configured to engage the engagement surface (16). The pad body (18) is formed at least in part from a body material (18A) including high-density polyethylene. The second body surface (22) of the pad body (18) has a static coefficient of friction of at least approximately 1.0. The second body surface (22) includes a plurality of spaced apart surface features (234), each of the plurality of surface features (234) having a feature height (358) of between approximately 0.15 millimeters and 1.00 millimeters. The adhesive material (232) is positioned on the first body surface (20) such that the first body surface (20) is configured to be fixedly coupled to the outer surface (14) of the device (10).

20 Claims, 6 Drawing Sheets

(56) References Cited

U.S. PATENT DOCUMENTS

| | | |
|---|---|---|
| 7,125,602 B2 | 10/2006 | Wheatley |
| 7,459,180 B2 * | 12/2008 | Hamdar .................... B32B 3/08 427/180 |
| 8,518,510 B1 | 8/2013 | Wheatley |
| 2004/0197500 A9 | 10/2004 | Swoboda et al. |
| 2013/0022792 A1 | 1/2013 | Antonini |
| 2014/0335321 A1 | 11/2014 | Reisman et al. |
| 2014/0377493 A1 | 12/2014 | Wisnefsky |

* cited by examiner

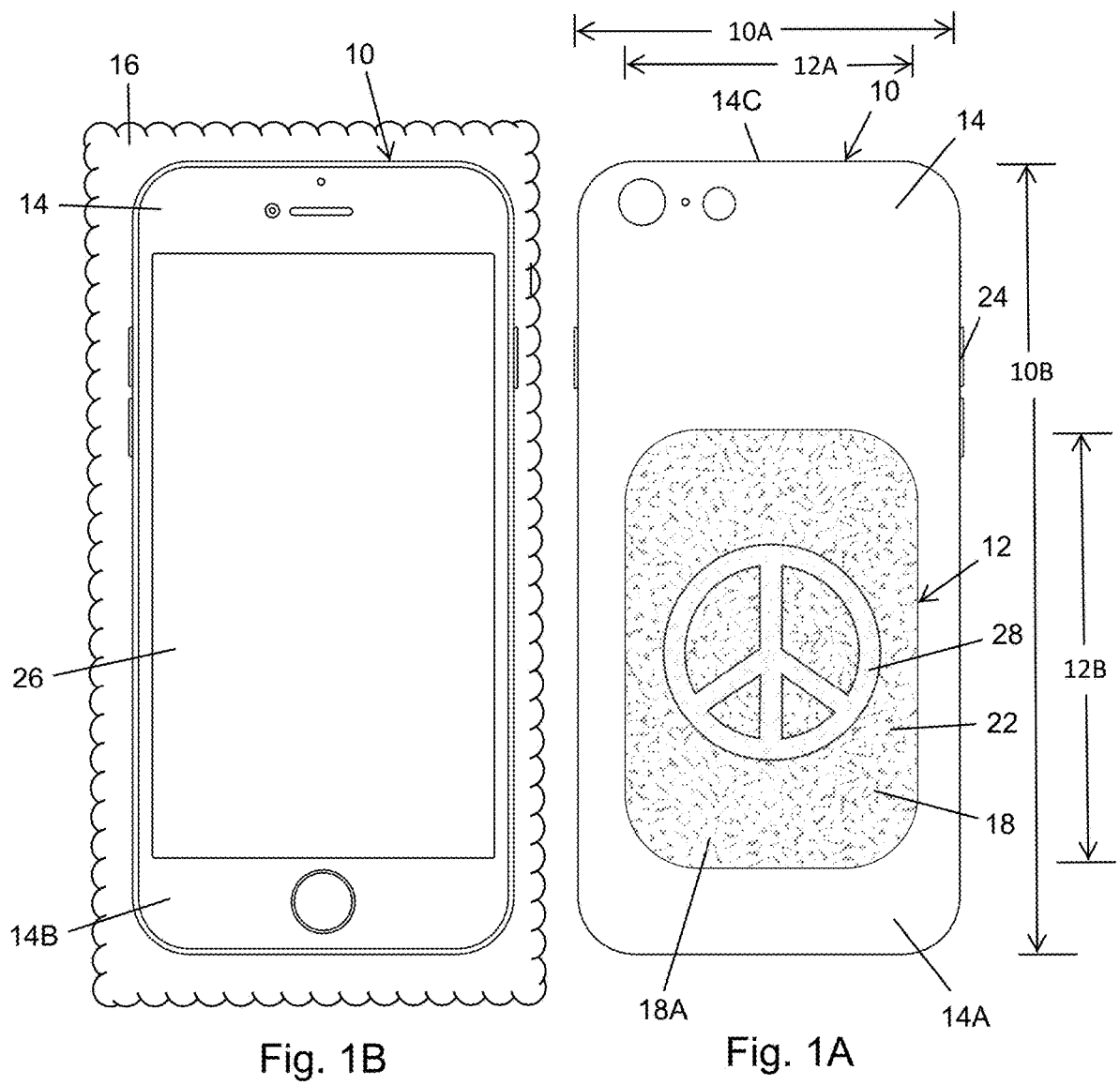

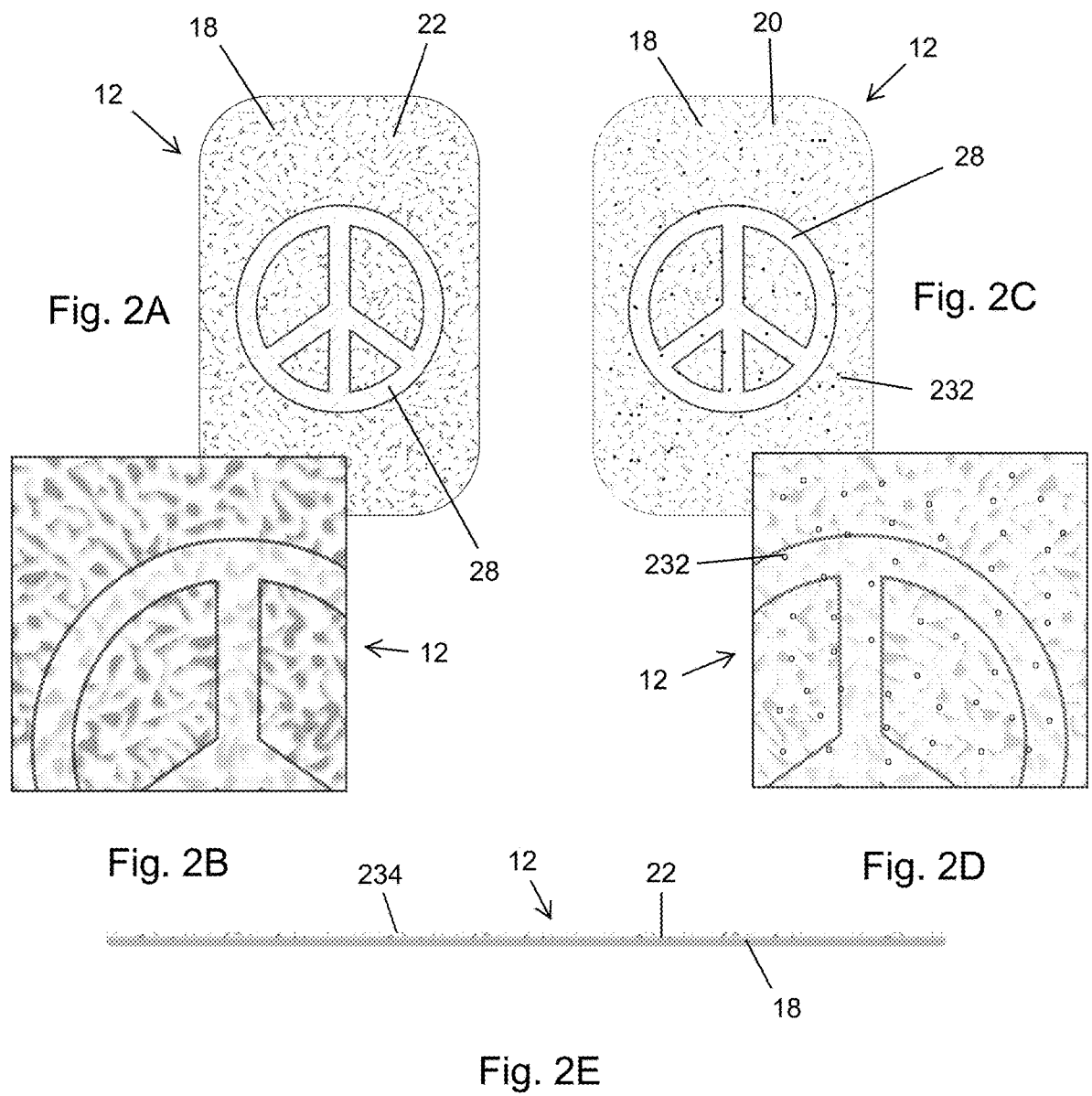

FRICTION PAD WITH ENHANCED ANTI-SLIP PROPERTIES

RELATED APPLICATIONS

The present application is a continuation-in-part application and claims the benefit under 35 U.S.C. 120 on copending U.S. patent application Ser. No. 15/917,451, filed on Mar. 9, 2018, and entitled "FRICTION PAD FOR A PORTABLE ELECTRONIC DEVICE". Additionally, U.S. patent application Ser. No. 15/917,451 claims priority on (i) U.S. Provisional Application Ser. No. 62/564,514, filed on Sep. 28, 2017, and entitled "FRICTION PAD FOR A PORTABLE ELECTRONIC DEVICE", and (ii) U.S. Provisional Application Ser. No. 62/474,024, filed on Mar. 20, 2017, and entitled "FRICTION PAD FOR A PORTABLE ELECTRONIC DEVICE". As far as permitted, the contents of U.S. patent application Ser. No. 15/917,451 and U.S. Provisional Application Ser. Nos. 62/564,514 and 62/474,024 are incorporated in their entirety herein by reference.

BACKGROUND

As the years go by, people in general are getting more and more attached to any and all of their personal, portable electronic devices, e.g., smartphones, cellular phones, radios, CD players, MP3 players, video recorders, DVD players, tablet computers, laptop computers, etc. However, in many situations, people have issues holding onto their portable electronic devices or otherwise have trouble maintaining physical control and positioning of their portable electronic devices. Additionally, in other situations, people want to have ready access to their portable electronic devices without actually holding the devices. For example, people may want to have easy access to their portable electronic devices while performing various activities, but without actually having to hold the devices in their hands. Accordingly, it is desired to provide a means by which a user can more securely retain their portable electronic devices, e.g., in their hands and/or on a nearby surface. Additionally, it is further desired that the device can subsequently be removed from the surface without damaging or otherwise marring the device or the surface.

Additionally, many people, especially seniors and those with disabilities, can have difficulty holding onto and/or effectively maintaining control of various objects, and/or inhibiting slipping when coming in contact with any surface with one's hands or feet. Accordingly, it is further desired to provide a friction pad with enhanced anti-slip properties that a person can use in any situation when improved gripping with hands or feet is desired.

SUMMARY

The present invention is directed toward a friction pad for inhibiting movement of a device relative to an engagement surface, the device including an outer surface. In various embodiments, the friction pad includes a pad body and an adhesive material. The pad body has a first body surface and an opposed second body surface. The first body surface is configured to be coupled to the outer surface of the device. The second body surface is configured to engage the engagement surface. The pad body is formed at least in part from a body material including high-density polyethylene. The second body surface of the pad body has a static coefficient of friction of at least approximately 1.0. The second body surface includes a plurality of spaced apart surface features, each of the plurality of surface features having a feature height of between approximately 0.15 millimeters and 1.00 millimeters. The adhesive material is positioned on the first body surface such that the first body surface is configured to be fixedly coupled to the outer surface of the device.

In some embodiments, the adhesive material is modified solvent acrylic.

Additionally, in certain embodiments, the second body surface is an embossed surface.

Further, in some embodiments, the body material has a shore hardness of between approximately 55 and 85. Additionally, in certain embodiments, the body material has a density of between approximately 0.75 and 1.20 g/cm$^3$.

Additionally, in some embodiments, the feature height of each of the plurality of surface features is at least approximately 0.5 millimeters.

Further, in certain applications, the engagement surface can be one of a desktop, a tabletop, a countertop, a hand of a user, a leg of the user, and a foot of the user.

The present invention is further directed toward a friction pad for inhibiting movement of a portable electronic device relative to an engagement surface, the portable electronic device including an outer surface, the friction pad including a pad body having a first body surface and an opposed second body surface, the first body surface being configured to be coupled to the outer surface of the portable electronic device, and the second body surface being configured to engage the engagement surface, the second body surface of the pad body having a static coefficient of friction of at least approximately 1.0, and the second body surface including a plurality of spaced apart surface features, each of the plurality of surface features having a feature height of between approximately 0.15 millimeters and 1.00 millimeters; and an adhesive material on the first body surface such that the first body surface is configured to be fixedly coupled to the outer surface of the portable electronic device.

Additionally, the present invention is also directed toward a friction pad for inhibiting movement of an object relative to an engagement surface, the friction pad including a pad body having a first body surface and an opposed second body surface, the first body surface being configured to be coupled to the object, and the second body surface being configured to engage the engagement surface, the pad body being formed at least in part from a body material including high-density polyethylene, each of the first body surface and the second body surface of the pad body having a static coefficient of friction of at least approximately 1.0, and each of the first body surface and the second body surface including a plurality of spaced apart surface features, each of the plurality of surface features having a feature height of between approximately 0.15 millimeters and 1.00 millimeters.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a simplified rear view illustration of a device and an embodiment of a friction pad having features of the present invention that is secured to the device;

FIG. 1B is a simplified front view illustration of the device illustrated in FIG. 1A, the device being positioned on an engagement surface;

FIG. 10 is a simplified side view illustration of the device and the friction pad illustrated in FIG. 1A;

FIG. 2A is a simplified plan view illustration of a second body surface of the friction pad illustrated in FIG. 1A;

FIG. 2B is a simplified enlarged plan view illustration of a portion of the second body surface of the friction pad illustrated in FIG. 2A;

FIG. 2C is a simplified plan view illustration of a first body surface of the friction pad illustrated in FIG. 2A;

FIG. 2D is a simplified enlarged plan view illustration of a portion of the first body surface of the friction pad illustrated in FIG. 2A;

FIG. 2E is a simplified enlarged side view illustration of the friction pad illustrated in FIG. 2A;

DESCRIPTION

Figure 3A:
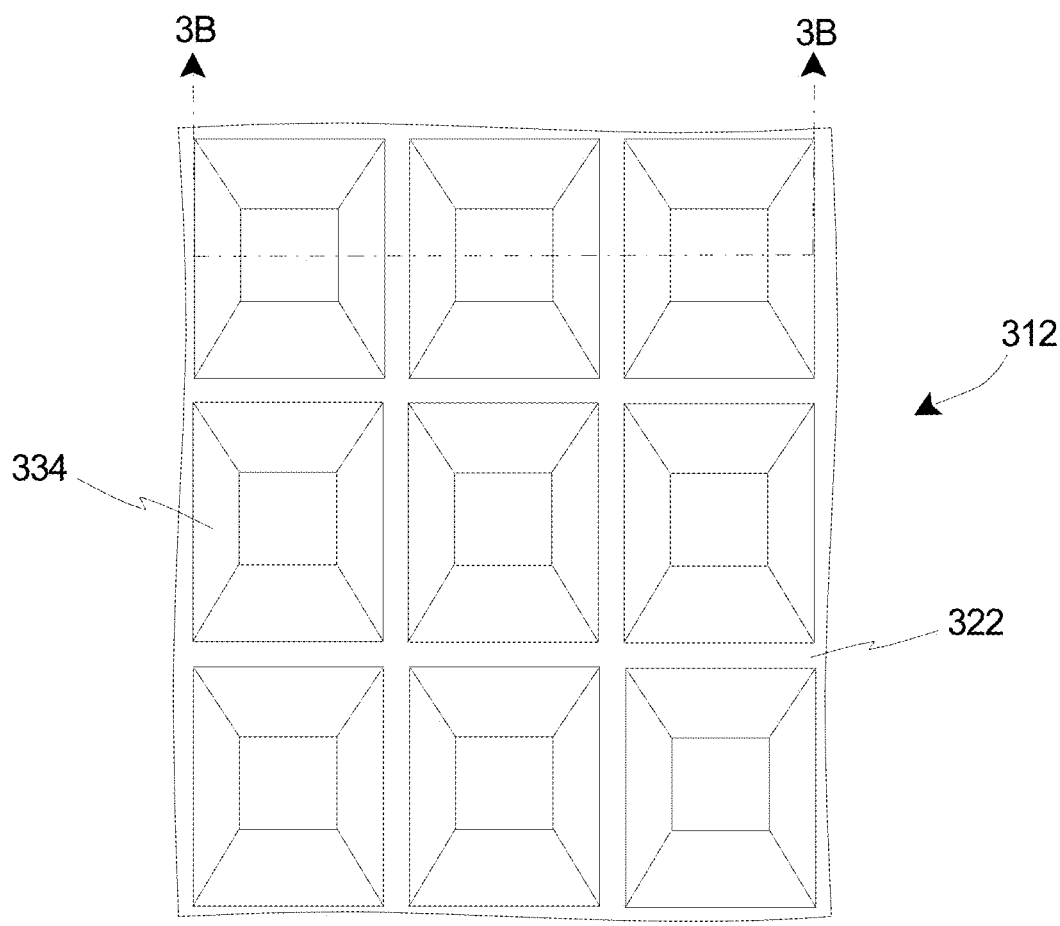
FIG. 3A is a simplified top view illustration of a portion of another embodiment of the friction pad.

Embodiments of the present invention are described herein in the context of a friction pad that can be selectively coupled to a surface of a device, e.g., a portable electronic device or another suitable device, for enabling a user to more securely retain the device. For example, in some embodiments, the friction pad can be utilized to enable the user to more securely retain the device in a hand of the user. Additionally and/or alternatively, the friction pad can also be utilized to enable the user to securely retain the device along a surface, e.g., a desktop, a tabletop, a countertop, etc. Further, or in the alternative, the friction pad can also be utilized to provide desired anti-slip properties between the user (e.g., the hands or feet of the user) and/or another engagement surface relative to any type of object or device. As such, it is intended that any reference herein to a "device" can refer to any suitable object or device.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1A is a simplified rear view illustration of a device 10 and an embodiment of a friction pad 12 having features of the present invention that is coupled to the device 10.

In some embodiments, the device 10 can be a portable electronic device such as a smartphone, a cellular phone, a radio, a CD player, an MP3 player, a video recorder, a DVD player, a tablet computer, a laptop computer, etc. Further, each electronic device 10 can include one or more processors and/or electronic storage devices. Alternatively, the device 10 can be anything where it is desired to easily and securely grip the device 10 and/or maintain the position of the device 10, especially for users such as seniors, people with disabilities, caregivers, and do-it-yourselfers. For example, certain non-exclusive alternative possibilities for the device 10 include tools, remote controls, game controllers, hearing aids, portable oxygen tanks, medical devices, eating trays, eating utensils, cutting boards, jars, automobile dashboards, bathtubs, ramps, wheelchair foot plates, wheel chair top tubes, wheel chair cushions, chairs, and the like. Still alternatively, the device 10 can be another type of device.

As illustrated, the device 10 includes an outer surface 14, e.g., a rear surface 14A, a front surface 14B (illustrated in FIG. 1B), and one or more side surfaces 14C that extend between the rear surface 14A and the front surface 14B. In the embodiment shown in FIG. 1A, the device 10 is substantially rectangle-shaped. Alternatively, the device 10 can have another suitable shape. For example, in some non-exclusive alternative embodiments, the device 10 can be substantially triangle-shaped, square-shaped, hexagon-shaped, octagon-shaped, circle-shaped or oval-shaped.

As an overview, in certain embodiments, the friction pad 12 is uniquely configured to help maintain the desired positioning of the device 10 relative to an engagement surface 16 (illustrated in FIG. 1B). More specifically, the friction pad 12 can include a pad body 18 having a first body surface 20 (illustrated in FIG. 1C) that is configured to be coupled to the outer surface 14, e.g., the rear surface 14A or the front surface 14B, of the device 10, and an opposed second body surface 22 that is configured to engage and/or be coupled to the engagement surface 16, i.e. to maintain the position of the device 10 relative to the engagement surface 16 and/or to inhibit movement of the device 10 relative to the engagement surface 16. Additionally, as provided in detail herein, the second body surface 22 and/or the pad body 18 can include certain features, characteristics, properties and specifications that enable the pad body 18 to better serve its intended purpose. Further, the friction pad 12 can be coupled to any devices 10 to provide enhanced anti-slip properties for any suitable user that wants or needs to engage the device 10 with their hands or feet, or otherwise wants to use the device 10 with the device 10 maintained in a fixed position.

The friction pad 12 can be any suitable size to suit the specific requirements of the device 10 with which the friction pad 12 is to be used. For example, the friction pad 12 can typically be somewhat smaller than the portion of the outer surface 14 of the device 10, e.g., the rear surface 14A of the device 10 in the embodiment specifically illustrated in FIG. 1A, to which the friction pad 12 is coupled. Additionally, the friction pad 12 should still be sufficiently large that it can effectively retain the position of the device 10 relative to the engagement surface 16. However, it is appreciated that the friction pad 12 should not be too large so as to inhibit the ability of the user to effectively use the various features and components of the device 10. More specifically, the friction pad 12 should not be too large and should not be positioned along the outer surface 14 of the device 10 to inhibit access to any control features 24, e.g., buttons, tabs, etc. or display features 26 (illustrated in FIG. 1B), e.g., video screens, of the device 10.

As illustrated in FIG. 1A, the device 10 can have a device width 10A and a device length 10B. Further, the friction pad 12 has a pad width 12A and a pad length 12B. In certain embodiments, the friction pad 12 is designed so that the pad width 12A is equal to or less than the device width 10A, and the pad length 12B is equal to or less than the device length 10B. For example, in some such embodiments, the pad width 12A can be between approximately fifty percent (50%) and one hundred percent (100%) of the device width 10A; and the pad length 12B can be between approximately fifty percent (50%) and one hundred percent (100%) of the device length 10B.

Additionally, the pad body 18 of the friction pad 12 can be formed from any suitable materials for purposes of effectively maintaining the position of the device 10 relative to the engagement surface 16. For example, in one non-exclusive alternative embodiment, the pad body 18 is formed at least in part from a body material 18A that includes high-density polyethylene (HDPE), which is a polyethylene thermoplastic made from petroleum and that is known for its large strength-to-density ratio. In particular, in such embodiment, at least the second body surface 22, which is configured to engage the engagement surface 16, includes the body material 18A that is formed from HDPE. Additionally and/or alternatively, the body material 18A of the pad body 18 can include other suitable materials. Further, in some embodiments, the pad body 18 can be formed from a plurality of layers. In such embodiments, each layer can be formed from similar materials, or one or more of the plurality of layers can be formed from different materials.

In one embodiment, the entire pad body 18 is made of HDPE.

In some embodiments, the body material 18A of the pad body 18, i.e. of at least the second body surface 22, can have a density of between approximately 0.75 and 1.20 g/cm$^3$. More particularly, in certain such embodiments, the body material 18A of the pad body 18, i.e. of at least the second body surface 22, can have a density of between approximately 0.90 and 1.00 g/cm$^3$. Alternatively, the body material 18A can have a density that is different than the ranges specifically noted herein.

Additionally, in certain embodiments, the body material 18A of the pad body 18 can have a shore hardness of between approximately 55 and 85. Shore hardness of a material is defined by the material's resistance to permanent indentation. For example, in some such embodiments, the body material 18A can have a shore hardness of at least approximately 55, 60, 65, 70, 75, 80 or 85. Alternatively, the body material 18A of the pad body 18 can have a shore hardness that is greater than 85 or less than 55.

Further, in some non-exclusive alternative embodiments, the body material 18A can be formed such that the second body surface 22 has a static coefficient of friction of at least approximately 0.60. The higher the static coefficient of friction is of the second body surface 22, the better the friction pad 12 is able to effectively grip the engagement surface 16 so as to inhibit the device 10 from moving relative to the engagement surface 16. For example, in some, alternative, non-exclusive embodiments, the second body surface 22 can have a static coefficient of friction of (i) between 0.60 and 3.00; (ii) between 0.60 and 0.85; (iii) between 0.80 and 1.10; (iv) between 1.05 and 1.35; (v) between 1.30 and 1.60; (vi) between 1.55 and 1.85; (vii) between 1.80 and 2.10; (viii) between 2.05 and 2.35; (ix) between 2.30 and 2.60; (x) between 2.55 and 2.80; or (xi) between 2.75 and 3.00. More specifically, in certain non-exclusive embodiments, the second body surface 22 can have a static coefficient of friction of at least 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95 or 3.00. Alternatively, the body material 18A can be formed such that the second body surface 22 has a static coefficient of friction that is less than 0.60 or greater than 3.00.

In some embodiments, as shown in FIG. 1A, the friction pad 12 can include some type of indicia 28 that is formed on or into the pad body 18. For example, in certain such embodiments, the indicia 28 can be formed directly onto or into the second body surface 22 of the pad body 18. Alternatively, the indicia 28 can be included within a different layer of the pad body 18 and/or can be provided in the form of another layer of the pad body 18.

The indicia 28 can have any suitable design. For example, the indicia 28 can include a logo, a design, a symbol, a picture, an advertisement, a product or company name, or some other type of indicia.

Additionally, in various embodiments, the second body surface 22 can be formed to include an embossed surface and/or a textured surface. For example, the embossing or texturing of the second body surface 22 can be manufactured through a specifically designed embossing process. In particular, in some embodiments, the embossing process entails the use of an embossing roller which is effectively a highly accurate mangle that uses a nip process running at speed to bring the material at pressure underneath a debossed steel bar.

It is appreciated that the particular design or design features included within the embossed surface or textured surface can be varied as desired. As such, the scope of the present invention is not intended to be limited in any manner by the illustration of any particular embossing or texturing design in the included Figures or any specific designs that may be mentioned herein.

In certain embodiments, the embossing or texturing design can include a plurality of surface features 234 (as shown in FIG. 2E) that can be spaced apart from one another. For example, in some such embodiments, the surface features 234 of the embossed or textured surface can be spaced apart from one another, i.e. from adjacent surface features 234, by between approximately 0.05 millimeters and 1.50 millimeters. Alternatively, the spacing between the surface features 234 can be greater than or less than the specific limitations noted above.

Additionally, the surface features 234 can be of any suitable size and shape depending on the particular design of the surface features 234. Accordingly, the illustration and description of any particular designs for the surface features 234 herein is not intended to be limiting in any manner.

Further, in some embodiments, the surface features 234 can be configured to have a height, e.g., a peak-to-valley distance, of between approximately 0.15 millimeters and 1.00 millimeters. More specifically, in some such embodiments, the surface features 234 can be configured to have a height, e.g., a peak-to-valley distance, of between approximately 0.15 millimeters and 0.25 millimeters. Alternatively, the peak-to-valley distance of the surface features 234 can be greater than or less than the specific limitations noted above. Stated in another fashion, in alternative, non-exclusive embodiments, the surface features 234 are configured to have a peak-to-valley distance of at least 0.1, 0.15, 0.2, 0.25, 0.3, 0.4, 0.5, 0.6, 0.7, 0.8, 0.9, or 1 millimeters.

FIG. 1B is a simplified front view illustration of the device 10 illustrated in FIG. 1A. Additionally, the device 10 is illustrated in FIG. 1B as being coupled to and/or being positioned on the engagement surface 16.

It is appreciated that the engagement surface 16 can be any suitable type of surface, and the engagement surface 16 can be either substantially planar or can include certain contours. For example, in certain applications, the engagement surface 16 can be a hand or a leg of a user of the device 10. In such applications, the friction pad 12 (illustrated in FIG. 1A) can make it much easier for the user to hold onto the device, i.e. without dropping the device 10 or without otherwise losing physical control of the device 10. In other applications, the engagement surface 16 can be any suitable surface that may be near the user while the user is performing an activity that makes actual holding of the device 10 difficult in any manner. In such applications, the friction pad 12 can be utilized to maintain the position of the device 10 relative to the engagement surface 16, and to inhibit movement of the device 10 relative to the engagement surface 16. More specifically, the user can merely want to keep the device 10 in a substantially constant position, i.e. without the device 10 sliding around on the engagement surface 16, so that the device 10 is easier to use. In such other applications, the engagement surface 16 can be a desktop, a tabletop, a countertop, or another suitable engagement surface 16.

Additionally, FIG. 1B also illustrates certain features or aspects of the device 10. More particularly, FIG. 1B illustrates that the outer surface 14 of the device 10 includes the front surface 14B into which the display features 26 such as a video screen can be formed.

Further, in various embodiments, the body material 18A (illustrated in FIG. 1A) of the pad body 18 (illustrated in FIG. 1A) is designed so that the friction pad 12, when coupled to the device 12, can be positioned to engage the engagement surface 16 and subsequently be removed from the engagement surface 16 without marring or otherwise damaging the engagement surface 16. For example, it is appreciated that many surfaces, such as a desktop, a tabletop, or a countertop, can have a finished surface configured to be aesthetically pleasing. Such surfaces can be formed of various alternative materials, and can be expensive to replace or repair. Thus, it can be desired to design the body material 18A so that the selectively coupling of the friction pad 12 to the engagement surface 16 will not mar or otherwise damage the engagement surface 16.

FIG. 10 is a simplified side view illustration of the device 10 and the friction pad 12 illustrated in FIG. 1A. In particular, FIG. 10 illustrates the first body surface 20 of the friction pad 12 being coupled to the outer surface 14, i.e. the rear surface 14A, of the device 10. FIG. 10 also illustrates the opposed, second body surface 22 of the friction pad 12.

Additionally, FIG. 10 also illustrates a pad thickness 30 of the pad body 18 of the friction pad 12. The pad body 18 can have any suitable pad thickness 30. For example, in some embodiments, the pad body 18 can have a pad thickness 30 of between approximately 0.675 millimeters (0.025 inches) and 2.54 millimeters (0.10 inches). Alternatively, the pad thickness 30 of the pad body 18 can be greater than 2.54 millimeters or less than 0.675 millimeters.

With this design, the friction pad 12 is a resilient, thick sticker that is secured to the device 10 to enhance how the device 10 is retained.

FIGS. 2A-2E provide alternative simplified illustrations of the friction pad 12. More specifically, FIG. 2A is a simplified plan view illustration of the friction pad 12, i.e. looking at the second body surface 22 of the pad body 18 of the friction pad 12; FIG. 2B is a simplified enlarged plan view illustration of a portion of the second body surface 22 of the friction pad 12 illustrated in FIG. 2A; FIG. 2C is a simplified plan view illustration of the friction pad 12 illustrated in FIG. 2A, i.e. looking at the first body surface 20 of the pad body 18 of the friction pad 12; FIG. 2D is a simplified enlarged plan view illustration of a portion of the first body surface 20 of the friction pad 12 illustrated in FIG. 2A; and FIG. 2E is a simplified enlarged side view illustration of the friction pad 12 illustrated in FIG. 2A.

FIGS. 2A-2E illustrate certain additional features and aspects of the friction pad 12 that were not readily visible or apparent in FIGS. 1A-1C. For example, in FIG. 2A, the indicia 28 is clearly visible on or through the second body surface 22. Additionally, in FIG. 2C, the indicia 28 is also somewhat visible when looking directly at the first body surface 20. The indicia 28 is visible when looking at the second body surface 22 even if the indicia 28 is not formed directly on or into the second body surface 22, and is also visible when looking at the first body surface 20, because in many embodiments, at least a portion of the pad body 18 is at least partially translucent or transparent.

The type of indicia 28 integrated into the friction pad 12 can vary. As alternative, non-exclusive embodiments, the indicia 28 can be a peace symbol, team logos, artwork, objects, or scenes that is formed on or into the friction pad 12.

Additionally, FIGS. 2C and 2D also illustrate an adhesive material 232 (illustrated as small dots) that may be provided on the first body surface 20. The adhesive material 232 can be utilized to effectively couple the friction pad 12 to the outer surface 14 (illustrated in FIG. 1A) of the device 10 (illustrated in FIG. 1A). In particular, in certain embodiments, the adhesive material 232 can be utilized to fixedly couple the first body surface 20 of the friction pad 12 to the outer surface 14 of the device 10. As utilized herein, the term "fixedly couple" signifies that the coupling between the first body surface 20 of the friction pad 12 and the outer surface 14 of the device 10 is substantially permanent so that the friction pad 12 cannot be easily or readily removed from the outer surface 14 of the device 10. Alternatively, in other embodiments, the first body surface 20 can be removably coupled to the outer surface 14 of the device 10. In one non-exclusive embodiment, the adhesive material 232 is a modified solvent acrylic. Alternatively, the adhesive material 232 can be another suitable material.

It is appreciated that with the use of the adhesive material 232 to fixedly couple the friction pad 12 to the outer surface 14 of the device 10, the attachment between the device 10 and the friction pad 12 is greater or stronger than the attachment between the friction pad 12 and the engagement surface 16 (illustrated in FIG. 1B). Such design enables a user to easily remove the device 10 with the friction pad 12 attached thereto from the engagement surface 16, without the friction pad 12 separating from the device 10. For example, in certain non-exclusive alternative embodiments, the attachment between the device 10 and the friction pad 12 is at least approximately 10%, 20%, 30%, 40%, 50%, 60%, 70%, 80%, 90% or 100% stronger than the attachment between the friction pad 12 and the engagement surface 16. It is further appreciated, however, that in certain embodiments, it can still be desired that the friction pad 12 is removable from the outer surface 14 of the device 10 without damaging or otherwise marring the appearance of the friction pad 12 or the outer surface 14 of the device 10.

Further, in some embodiments, the friction pad 12 can include a backing layer (not shown) that can be positioned over the first body surface 20 so as to cover the adhesive material 232 on the first body surface 20. The backing layer prevents or resists the friction pad 12 from sticking or clinging to any surfaces when not intended. Subsequently, upon removal of the backing layer, the friction pad 12 can then be quickly and easily coupled to the device 10 as desired.

As noted above, FIG. 2E also illustrates the plurality of surface features 234 that can be formed on or into the second body surface 22 of the pad body 18.

FIG. 3A is a simplified schematic top view illustration of a portion of another embodiment of the friction pad 312. In particular, FIG. 3A is a simplified schematic view illustration of a portion of the friction pad 312 looking at the second surface 322 of the friction pad 312, i.e. the surface of the friction pad 312 that is configured to engage the engagement surface 16 (illustrated in FIG. 1B).

As illustrated in FIG. 3A, the friction pad 312 can include a plurality of surface features 334 that are spaced apart from one another. More specifically, FIG. 3A illustrates the plurality of surface features 334 in a waffle-like design pattern. Alternatively, the friction pad 312 and/or the plurality of surface features 334 can have a different design than what is illustrated in FIG. 3A. Additionally, the plurality of surface features 334 can be positioned in a different manner relative to one another.

Figure 3B:
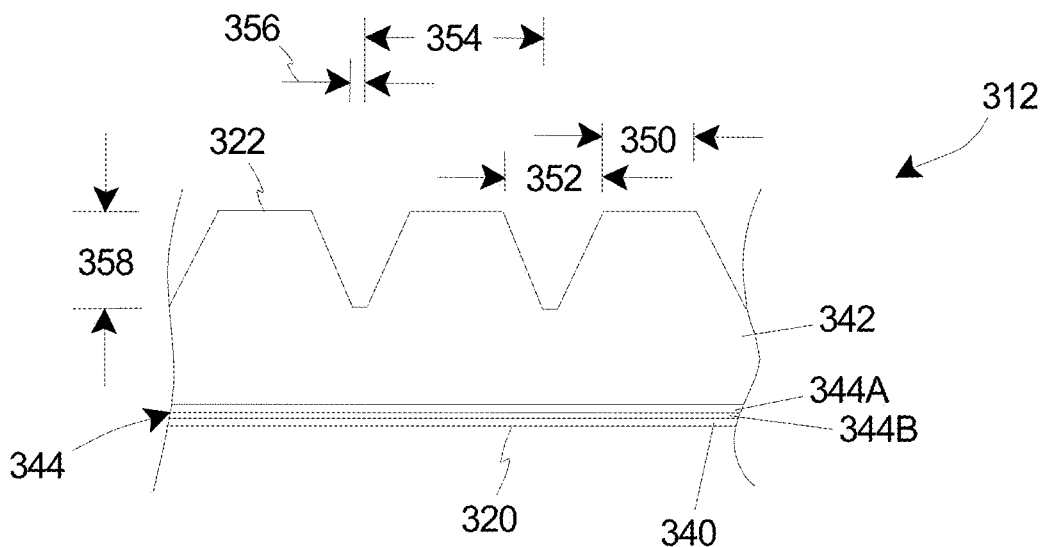
FIG. 3B is a cutaway view of the portion of the friction pad illustrated in FIG. 3A taken on line 3B-3B.

FIG. 3B is a cutaway view of the portion of the friction pad 312 illustrated in FIG. 3A taken on line 3B-3B. In particular, FIG. 3B illustrates that the friction pad 312 can be formed from a plurality of layers of material. Additionally, FIG. 3B illustrates certain design features that can be incorporated into each of the plurality of layers of material.

The design of the friction pad 312 can be varied. In certain embodiments, as shown in FIG. 3B, the friction pad 312 can include (i) a first layer 340 that incorporates the first surface 320 that is configured to engage and be secured to the device 10 (illustrated in FIG. 1A), i.e. an outer surface 14 (illustrated in FIG. 1A) of the device 10, (ii) a second layer 342 that incorporates the second surface 322 that is configured to selectively engage the engagement surface 16 (illustrated in FIG. 1B), and (iii) one or more inner layers 344 that are positioned substantially between the first layer 340 and the second layer 342.

As noted, the first layer 340 is configured to engage and be secured to an outer surface 14 of the device 10. In some embodiments, the first layer 340 can be an adhesive layer that enables secure bonding between the friction pad 312 and the device 10. For example, in certain such embodiments, the first (adhesive) layer 340 can be formed from an adhesive material such as a modified solvent acrylic. Alternatively, the first layer 340 can have a different design and/or be formed from different materials, e.g., different adhesive materials.

Additionally, as noted, the second layer 342 of the friction pad 312 is configured to selectively engage the engagement surface 16 so as to better maintain the positioning of the device 10 relative to the engagement surface 16. In various embodiments, as provided in detail above, the second layer 342 can be formed from high-density polyethylene (HDPE). Alternatively, the second layer 342 can be formed from other suitable materials.

Additionally, as shown, the second layer 342 can include the plurality of surface features 334. The size and shape of the surface features 334 can be varied as desired. As illustrated in FIG. 3B, the surface features 334 can have an upper surface width 350, an upper surface spacing 352 (i.e. between adjacent surface features 334), a lower surface width 354, a lower surface spacing 356 (i.e. between adjacent surface features 334), and a feature height 358 (i.e. a feature peak-to-valley distance). The dimensions of each of the features and aspects of the surface features 334 can be varied.

In certain non-exclusive embodiments, (i) the upper surface width 350 of the surface features 334 can be between approximately 1.35 millimeters and 2.05 millimeters; (ii) the upper surface spacing 352 between adjacent surface features 334 can be between approximately 1.15 millimeters and 1.50 millimeters; (iii) the lower surface width 354 of the surface features 334 can be between approximately 2.50 millimeters and 3.50 millimeters; (iv) the lower surface spacing 356 between adjacent surface features 334 can be between approximately 0.05 millimeters and 0.15 millimeters; and (v) the feature height 358 of the surface features 334 can be between approximately 1.00 millimeters and 2.00 millimeters. Alternatively, the upper surface width 350, the upper surface spacing 352, the lower surface width 354, the lower surface spacing 356, and the feature height 358 can be different than, i.e. greater than or less than, the dimensions specifically noted herein above.

In some embodiments, the one or more inner layers 344 can be included in order to provide the indicia 28 (illustrated in FIG. 1A). Additionally, the positioning of the inner layers 344 between the first layer 340 and the second layer 342 can be configured to protect the indicia 28 from potentially delaminating from the remainder of the friction pad 312 during use and aging of the friction pad 312. In particular, in this embodiment, the one or more inner layers 344 can function as an indicia layer assembly. For example, as shown, the indicia layer assembly 344 can include an ink layer 344A and an indicia substrate 344B.

For purposes of using the indicia layer assembly 344, the ink layer 344A is positioned on a surface of the indicia substrate 344B. It is appreciated that the ink layer 344A can be positioned on either surface of the indicia substrate 344B, i.e. such that the ink layer 344A will be on the surface of the indicia substrate 344B closer to the second layer 342, or such that the ink layer 344A will be on the surface of the indicia substrate 344B closer to the first layer 340.

In certain embodiments, the ink layer 344A can utilize an ultraviolet (UV) ink, e.g., a UV curable ink, that provides a glossy appearance. For example, in one non-exclusive alternative embodiment, the ink layer 344A can utilize Amplifi AMP UV Ink from Fujifilm Corporation, which is headquartered in Tokyo, Japan. Alternatively, the ink layer 344A can utilize another suitable ink.

Additionally, in some embodiments, the indicia substrate 344B can be formed from polyethylene, polypropylene, polystyrene, or another suitable material. In some such embodiments, the indicia substrate 344B can be formed from polyethylene or polypropylene materials having a surface tension level of at least approximately thirty-eight dynes per centimeter.

Figure 4A:
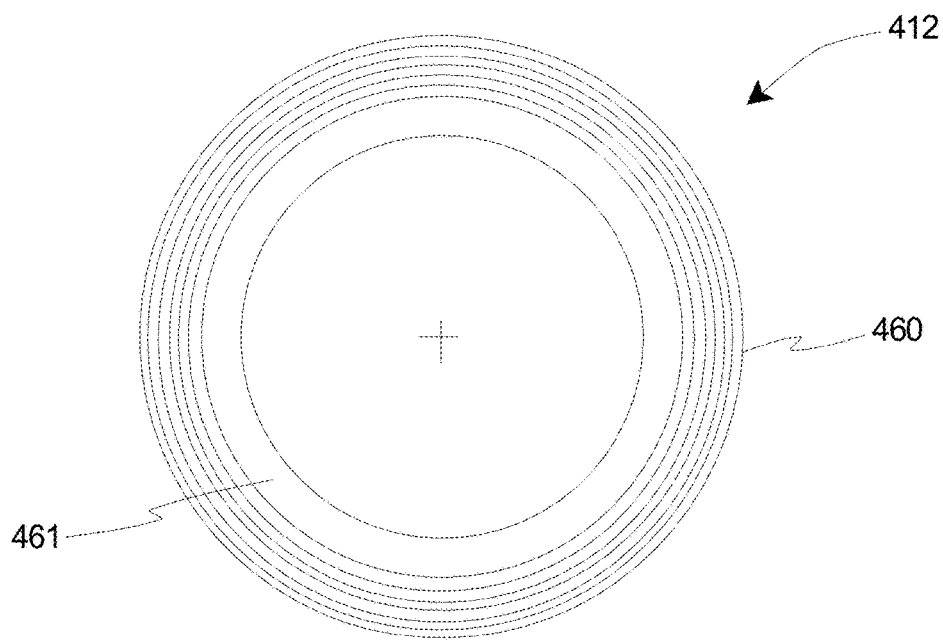
FIG. 4A is a simplified side view illustration of still another embodiment of the friction pad arranged in the form of a material roll.

FIG. 4A is a simplified side view illustration of still another embodiment of the friction pad 412 arranged in the form of a material roll 460, with the friction pad 412 wrapped around a hub 461. With this design, it is appreciated that the friction pad 412 can be provided (e.g., cut) in various alternative desired lengths, depending upon the intended use of the friction pad 412, and the size of the device 410 (illustrated in FIG. 4C) and/or the engagement surface 16 (illustrated in FIG. 1A) with which the friction pad 412 is to be used. More particularly, in this embodiment, the friction pad 412 (provided essentially in a tape-like form) can be cut to any desired length from the material roll 460 so as to be usable for any desired purposes.

Figure 4B:
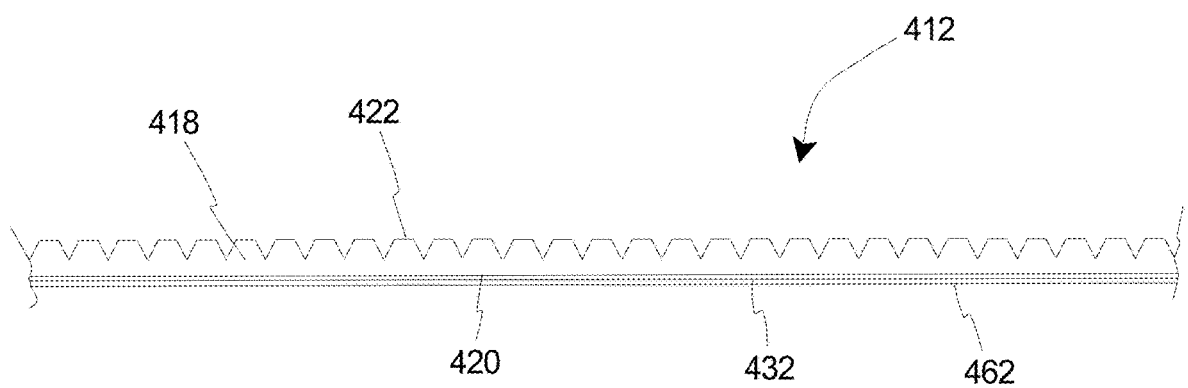
FIG. 4B is a simplified side view of a portion of the friction pad illustrated in FIG. 4A that has been removed from the material roll.

FIG. 4B is a simplified side view of a portion of the friction pad 412 illustrated in FIG. 4A that has been removed from the material roll 460 (illustrated in FIG. 4A). As shown in the embodiment illustrated in FIG. 4B, the friction pad 412 again includes include a pad body 418 having a first body surface 420 that is configured to be coupled to and/or engage an outer surface 414 (illustrated in FIG. 4C) of the device 410 (illustrated in FIG. 4C), and an opposed second body surface 422 that is configured to engage and/or be coupled to the engagement surface 16 (illustrated in FIG. 1B), i.e. to maintain the position of the device 410 relative to the engagement surface 16 and/or to inhibit movement of the device 410 relative to the engagement surface 16. In certain applications, the friction pad 412 can be coupled to any devices 410 to provide enhanced anti-slip properties for any suitable user that wants or needs to engage the device 410, e.g., with their hands or feet, or otherwise wants to use the device 410 with the device 410 maintained in a fixed position.

Additionally, as provided herein, the second body surface 422 and/or the pad body 418 can include certain features, characteristics, properties and specifications that enable the pad body 418 to better serve its intended purpose. For example, as shown, the second body surface 422 can be formed to include an embossed surface and/or a textured surface. As above, it is appreciated that the particular design or design features included within the embossed surface or textured surface can be varied as desired. As such, the scope of the present invention is not intended to be limited in any manner by the illustration of any particular embossing or texturing design in the included Figures or any specific designs that may be mentioned herein.

Further, as shown, the friction pad 412 can also include an adhesive material 432 that may be provided on the first body surface 420. As above, the adhesive material 432 can be utilized to effectively couple the friction pad 412 to the outer surface 414 of the device 410. For example, in certain embodiments, the adhesive material 432 can be utilized to fixedly couple the first body surface 420 of the friction pad 412 to the outer surface 414 of the device 410. Alternatively, in other embodiments, the first body surface 420 can be removably coupled to the outer surface 414 of the device 410. In one non-exclusive embodiment, the adhesive material 432 is a modified solvent acrylic. Alternatively, the adhesive material 432 can be another suitable material.

Additionally, as illustrated in FIG. 4B, in some embodiments, the friction pad 412 can include a backing layer 462 that can be positioned over the first body surface 420 so as to cover the adhesive material 432 on the first body surface 420. The backing layer 462 prevents or resists the friction pad 412 from sticking or clinging to any surfaces when not intended. Subsequently, upon removal of the backing layer 462, the friction pad 412 can then be quickly and easily coupled to the device 410 as desired.

Figure 4C:
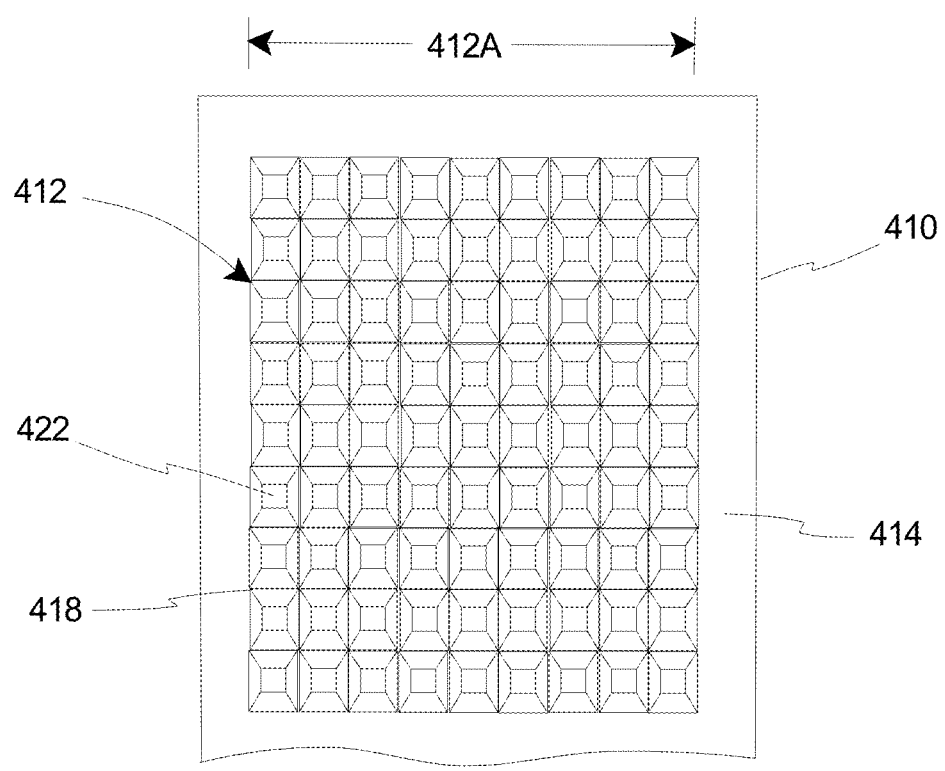
FIG. 4C is a simplified top view of a portion of the friction pad illustrated in FIG. 4A that is positioned on an object.

FIG. 4C is a simplified top view of a portion of the friction pad 412 illustrated in FIG. 4A that is positioned on a device 410, e.g., a wheelchair foot plate. More specifically, the friction pad 412 is shown in FIG. 4C being coupled to the outer surface 414 of the device 410, with the first body surface 420 (illustrated in FIG. 4B) being coupled to the outer surface 414 of the device 410, and the second body surface 422 facing outwardly to engage or be engaged by an engagement surface 16 (illustrated in FIG. 1B).

As shown in FIG. 4C, the friction pad 412 can be cut to any desired length, i.e. from the material roll 460 (illustrated in FIG. 4A), depending on the purpose for which it is to be used. Additionally, as shown, the friction pad 412 and/or the pad body 418 can be configured to have any suitable pad width 412A, which would be consistent along a full length of the material roll 460. For example, in certain non-exclusive alternative embodiments, the friction pad 412 and/or the pad body 418 can have a pad width 412A of between approximately one inch and six inches. In one particular embodiment, the friction pad 412 and/or the pad body 418 can have a pad width 412A of approximately two inches. Alternatively, the friction pad 412 and/or the pad body 418 can have a pad width 412A of greater than six inches, less than one inch, or any other suitable value between one inch and six inches.

Figure 5A:
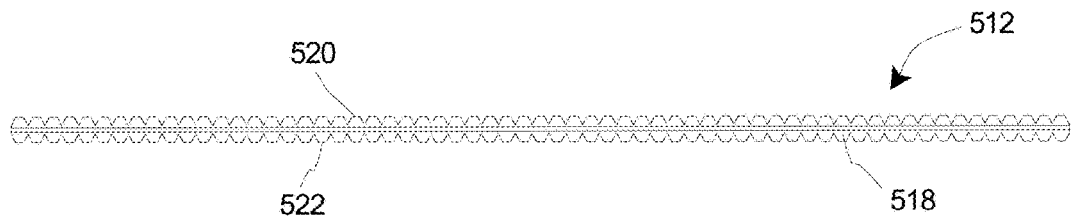
FIG. 5A is a simplified side view of yet another embodiment of the friction pad.

FIG. 5A is a simplified side view of yet another embodiment of the friction pad 512. In this embodiment, the friction pad 512 is configured so that each of the first body surface 520 and the second body surface 522 of the pad body 518 can have an embossed surface and/or a textured surface. With such design, it is appreciated that the friction pad 512 can provide comparable anti-slip properties with both body surfaces 520, 522.

As above, it is appreciated that the particular design or design features included within the embossed surface or textured surface can be varied as desired. Additionally, in alternative embodiments, the embossed surface and/or textured surface of the first body surface 520 can be substantially the same as the embossed surface and/or textured surface of the second body surface 522, or the embossed surface and/or textured surface of the first body surface 520 can be different than the embossed surface and/or textured surface of the second body surface 522.

Further, it is appreciated that the friction pad 512 illustrated in FIG. 5A, i.e. with both opposing body surfaces 520, 522 having an embossed and/or textured surface, can be formed in any suitable manner. For example, in one embodiment, the friction pad 512 can be formed such that the pad body 518 is originally formed with both opposing body surfaces 520, 522 having such embossed and/or textured surfaces. Alternatively, in another embodiment, the friction pad 512 can be formed by providing two friction pads 412 such as illustrated in FIG. 4A and adhering them together, i.e. with the adhesive material 432 (illustrated in FIG. 4B) of one friction pad 412 being directly adhered to the adhesive material 432 of another friction pad 412. Still alternatively, the friction pad 512 can be formed in another suitable manner.

Figure 5B:
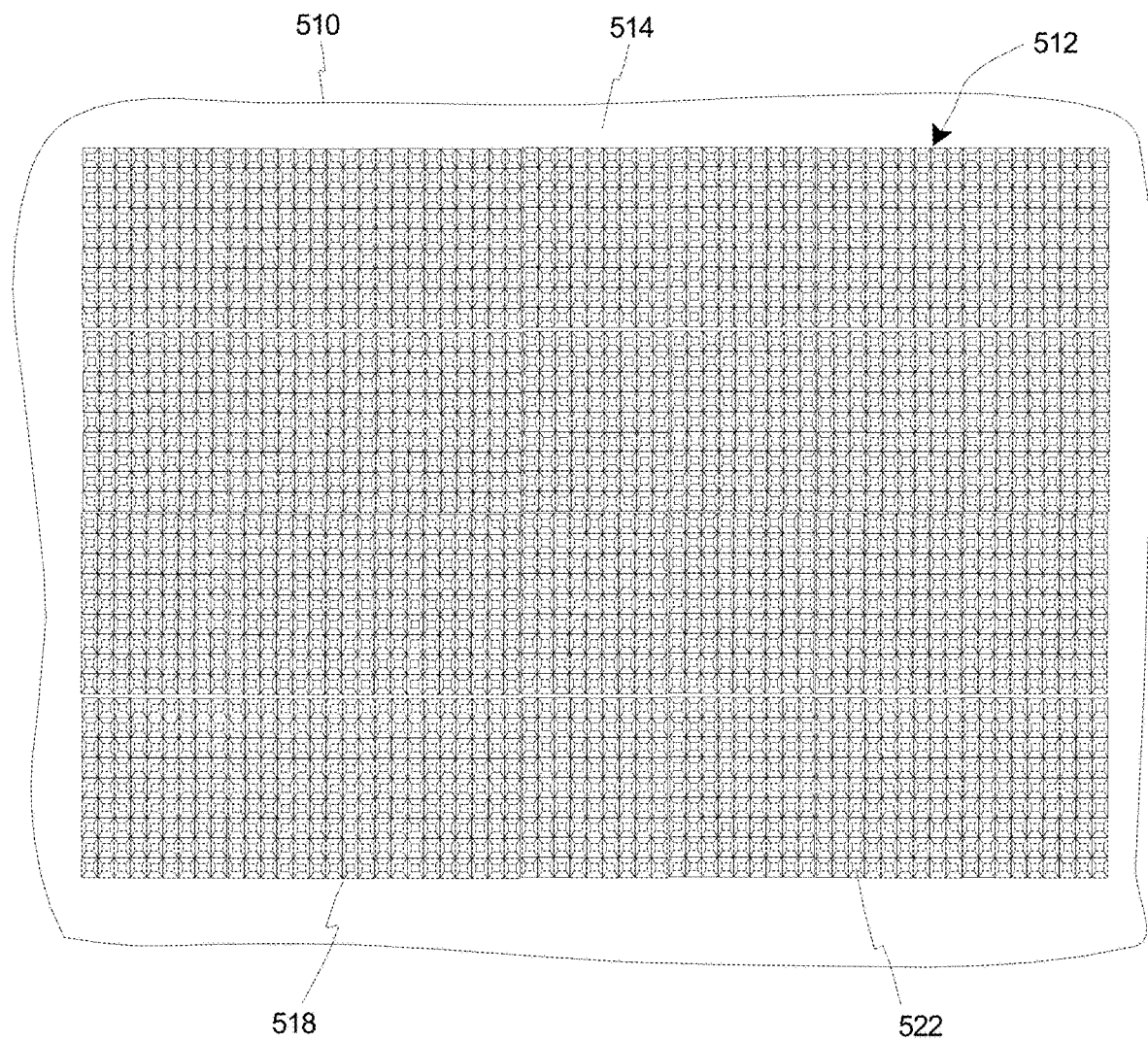
FIG. 5B is a simplified top view of the friction pad illustrated in FIG. 5A that is positioned on a surface.

FIG. 5B is a simplified top view of the friction pad 512 illustrated in FIG. 5A that is positioned on the outer surface 514 of a device 510. It is appreciated that the friction pad 512 can be used with any suitable type of device 510, many of which have been listed herein above.

Additionally, as noted above, with such design, the friction pad 512 can provide anti-slip properties with each of the first body surface 520 (illustrated in FIG. 5A) and the second body surface 522 of the pad body 518. Further, depending on the particular designs of the embossed and/or textured surfaces of each of the body surfaces 520, 522, it is appreciated that the friction pad 512 can be positioned with either body surface 520, 522 engaging the outer surface 514 of the device 510, and either body surface 520, 522 being positioned so as to engage or be engaged by the engagement surface 16 (illustrated in FIG. 1B).

As non-exclusive examples, the friction pad 512 can be used on the floor or other surface to aid in stability in getting out of bed in the morning, making transfers from wheelchairs to beds, chairs, etc., dashboards, keep tools in place, keep objects in place on nightstands.

It understood that although a number of different embodiments of the friction pad 12 have been illustrated and described herein, one or more features of any one embodiment can be combined with one or more features of one or more of the other embodiments, provided that such combination satisfies the intent of the present invention.

While a number of exemplary aspects and embodiments of the friction pad 12 have been discussed herein above, those of skill in the art will recognize certain modifications, permutations, additions and sub-combinations thereof. It is therefore intended that the friction pad 12 shall be interpreted to include all such modifications, permutations, additions and sub-combinations as are within their true spirit and scope, and no limitations are intended to the details of construction or design herein shown.

What is claimed is:

1. A friction pad for inhibiting relative movement between a portable electronic device and an engagement surface, the portable electronic device including an outer surface, the friction pad comprising:
    a pad body having a first body surface and an opposed second body surface, the first body surface being configured to be coupled to the object, and the second body surface being configured to engage the engagement surface, the pad body being formed at least in part from a body material including high-density polyethylene, the second body surface of the pad body having a static coefficient of friction of at least approximately 1.0, and the second body surface including a plurality of spaced apart surface features, wherein at least a portion of the plurality of surface features have a feature height of between approximately 1.0 millimeters and 2.0 millimeters; wherein at least a portion of the plurality of surface features have a truncated pyramid shape and are organized in a grid; wherein at least a portion of the plurality of surface features have an upper surface spacing of at least 1.15 millimeters, and a lower surface spacing of at least 0.05 millimeters; wherein the second body surface is an embossed surface; and
    an adhesive material on the first body surface such that the first body surface is configured to be fixedly coupled to the outer surface of the portable electronic device.

2. The friction pad of claim 1 wherein the adhesive material is modified solvent acrylic.

3. The friction pad of claim 1 wherein the body material has a shore hardness of between approximately 55 and 85.

4. The friction pad of claim 1 wherein the body material has a density of between approximately 0.75 and 1.20 g/cm$^3$.

5. The friction pad of claim 1 wherein the engagement surface is one of a desktop, a tabletop, a countertop, a hand of a user, a leg of the user, and a foot of the user.

6. A combination for placement on an engagement surface, the combination comprising:
    a portable electronic device including an outer surface;
    a pad body having a first body surface and an opposed second body surface, the first body surface being configured to be coupled to the outer surface of the portable electronic device, and the second body surface being configured to engage the engagement surface, the pad body being formed at least in part from a body material including high-density polyethylene, the second body surface of the pad body having a static coefficient of friction of at least approximately 1.0, and the second body surface including a plurality of spaced apart surface features, a portion of the plurality of surface features having a feature height of between approximately 1.0 millimeters and 2.0 millimeters; and
    an adhesive material on the first body surface that fixedly couples the pad body to the outer surface of the portable electronic device.

7. The combination of claim 6 wherein the adhesive material is modified solvent acrylic.

8. The combination of claim 6 wherein the second body surface is an embossed surface.

9. The combination of claim 6 wherein the pad body is formed from a body material having a shore hardness of between approximately 55 and 85.

10. The combination of claim 6 wherein the pad body is formed from a body material having a density of between approximately 0.75 and 1.20 g/cm$^3$.

11. The combination of claim 6 wherein the feature height of each of the plurality of surface features is between approximately 1.0 millimeters and 2.0 millimeters.

12. The combination of claim 6 wherein the engagement surface is one of a desktop, a tabletop, a countertop, a hand of a user, a leg of the user, and a foot of the user.

13. The combination of claim 6 wherein at least a portion of the plurality of surface features have a truncated pyramid shape and are organized in a grid; and wherein at least a portion of the plurality of surface features have an upper surface spacing of at least 1.15 millimeters, and a lower surface spacing of at least 0.05 millimeters.

14. A friction pad assembly for inhibiting relative movement between an object and an engagement surface comprising:
    a hub; and
    a friction pad that is configured to inhibit relative movement between the object and the engagement surface, the friction pad being arrangeable as a material roll that is wrapped around the hub, the friction pad including:
        a pad body having a first body surface and an opposed second body surface, the first body surface being configured to be coupled to the object, and the second body surface being configured to engage the engagement surface, the pad body being formed at least in part from a body material including high-density polyethylene, the pad body having a pad width of between approximately one inch and six inches, the second body surface of the pad body having a static coefficient of friction of at least approximately 1.0, and the second body surface including a plurality of spaced apart surface features, wherein at least a portion of the plurality of surface features have a feature height of between approximately 1.0 millimeters and 2.0 millimeters; wherein a portion of the plurality of surface features have a truncated pyramid shape and are organized in a grid; wherein at least a portion of the plurality of surface features have an upper surface spacing of at least 1.15 millimeters, and a lower surface spacing of at least 0.05 millimeters; and
        an adhesive material on the first body surface such that the first body surface is configured to be fixedly coupled to the object.

15. The friction pad assembly of claim 14 further comprising a removable backing layer that is positioned over the first body surface to cover the adhesive layer.

16. The friction pad assembly of claim 14 wherein the adhesive material is modified solvent acrylic.

17. The friction pad assembly of claim 14 wherein the body material has a shore hardness of between approximately 55 and 85.

18. The friction pad assembly of claim 14 wherein the body material has a density of between approximately 0.75 and 1.20 g/cm$^3$.

19. The friction pad assembly of claim 14 wherein the feature height of each of the plurality of surface features is between approximately 1.0 millimeters and 2.0 millimeters.

20. The friction pad assembly of claim 14 wherein the engagement surface is one of a desktop, a tabletop, a countertop, a hand of a user, a leg of the user, and a foot of the user.

* * * * *